UNITED STATES PATENT OFFICE.

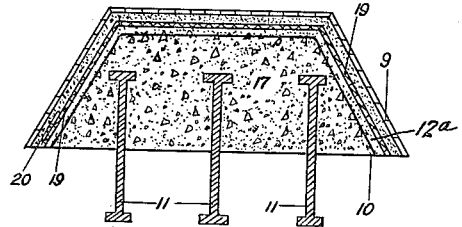
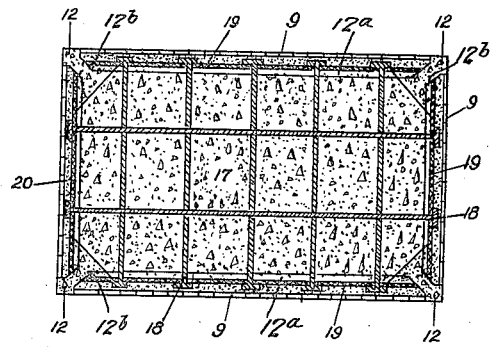
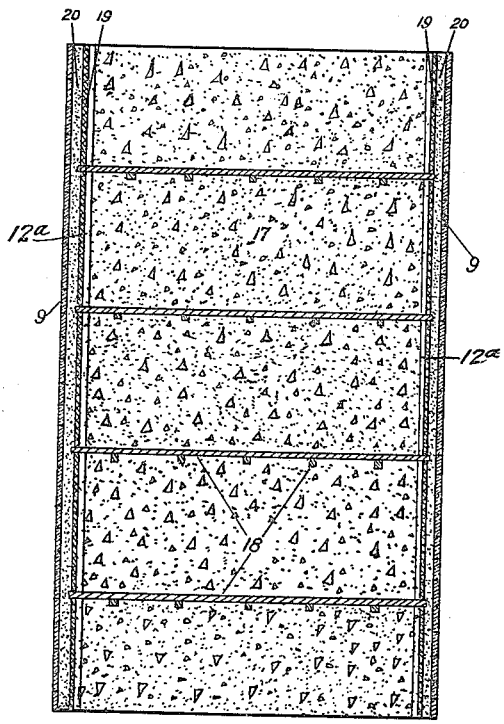
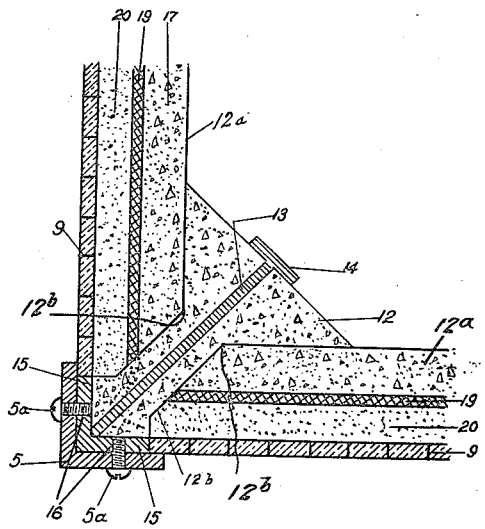

SYLVAIN LE DEIT, OF SAN JOSE, CALIFORNIA.

ARTIFICIAL MONUMENT.

1,307,366.  Specification of Letters Patent.  Patented June 24, 1919.

Application filed July 2, 1917. Serial No. 178,308.

*To all whom it may concern:*

Be it known that I, SYLVAIN LE DEIT, a citizen of the United States, residing at San Jose, in the county of Santa Clara and State of California, have invented a new and useful Improvement in Artificial Monuments, of which the following is a specification.

This invention relates to reinforced concrete and glass head stones or monuments, and its object is so to prepare glass and concrete that the same may be used in a way similar to tile and mosaic or marble slabs in their various applications.

The use of tile and marble is limited mainly to flat surfaces, and the designs are limited in the marble to the particular character of the marble itself and to the manner in which it is cut, and in tile to such designs as can be burnt therein or formed on the surface thereof, both materials and the ornamentation thereof being subject to deterioration through the action of the elements. Glass can be produced in an infinite variety of forms, and being practically indestructible through the action of the elements and susceptible of a very high polish offers an ideal substance for surfacing walls, domes, columns, etc., providing it can be prepared so as to receive the desired permanent decoration and be properly incorporated into the structure of the building of head stones or monuments.

I secure these and other desired results by permanently securing to the reinforced concrete, of whatever form it may be, a body of material composed of cement and sharp sand of any desired thickness, to hold the glass ornamentation to said reinforced concrete head stone or monument.

With this general object in view, the invention resides in certain novel features of construction and in the unique combinations of parts to be hereinafter fully described and claimed, the descriptive matter being supplemented by the accompanying drawings wherein:

Fig. 2 is a section of the top cap of said head stone or monument showing the reinforcing and connecting iron rods set therein.

Fig. 3 is a front longitudinal section of my invention showing reinforcing iron rods in position in the concrete formation, and wire screen in place, and concrete composed of cement and sharp sand on the outer surface thereof, into which is embedded glass mosaic ornamentation.

Fig. 4 is a sectional plan view showing reinforcing iron rods and solid concrete composed of cement, sand and gravel, corner concrete supports, wire screening, sharp sand and cement into which mosaic glass is imbedded.

Fig. 5 is a detail section of one of the corners showing the corner supports and longitudinal grooves therein, with anchor iron rods in place embedded in the supports, with metal corner outside protection fastened thereto, also showing the body concrete slab with wire screen embedded therein, and sharp sand and cement attached thereto, in which is embedded the mosaic glass ornamentation.

In these drawings which constitute a part of this application similar reference characters designate corresponding parts throughout the several views.

Figure 1:
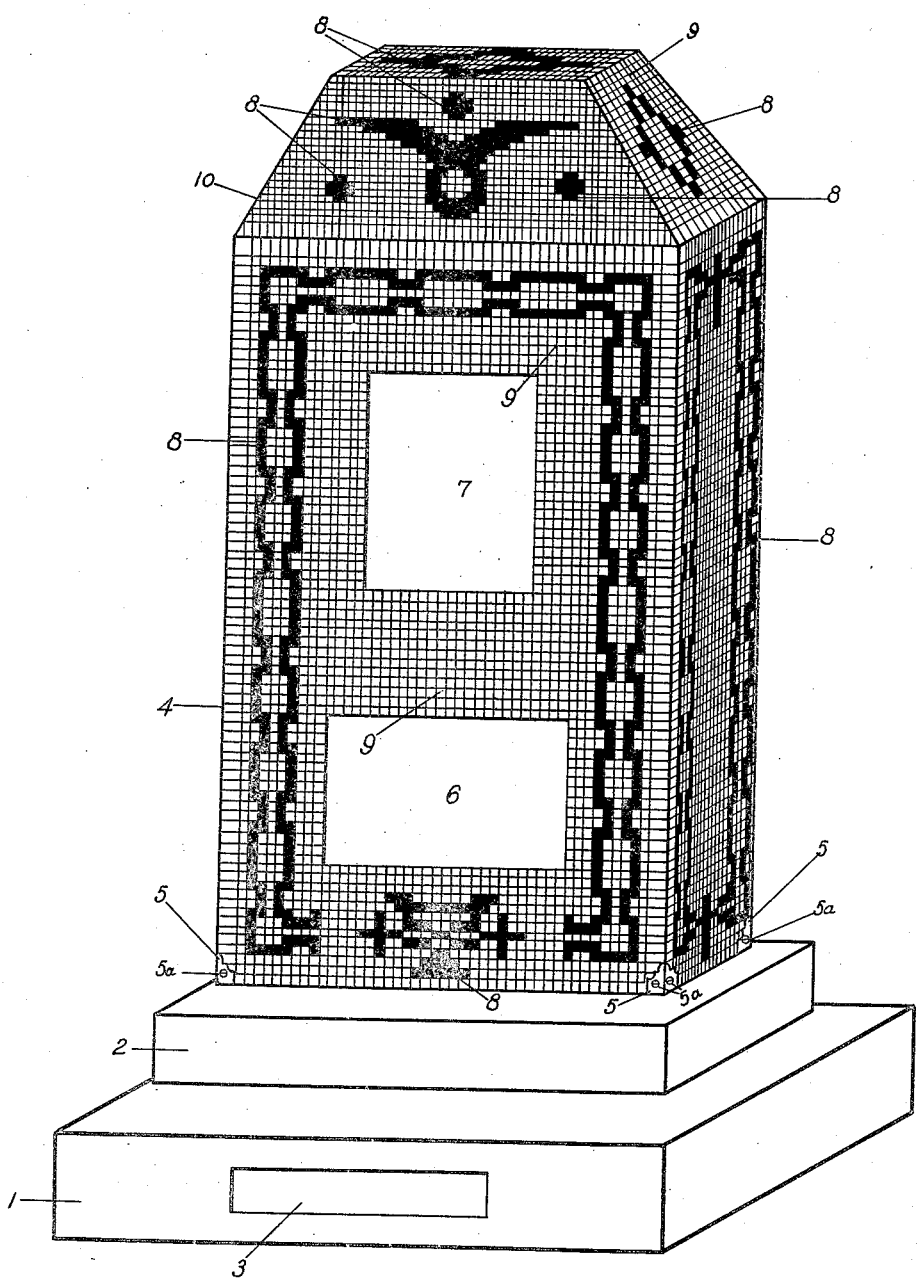
Figure 1 is a perspective view of my artificial monument, showing colored glass in mosaic ornamentation, and cavities in place to receive panel insertion.

Referring now more particularly to the characters of reference on the drawings, 1 designates the lower base.

2 is the upper portion which is an integral part thereof.

3 is the cavity in the lower base, adapted to insert glass or marble or any insertion required.

4 is the head stone or monument resting on the upper portion 2 of base 1.

Corner metal protecting supports are shown at 5, adapted to support and protect the corners of said monument or head stone 4, said corner metal protecting supports 5 may extend upward the entire length of said head stone or monument 4 when required.

6 is the lower cavity in the face of the head stone or monument 4, adapted to insert therein glass or marble or any insertion required.

7 is the upper cavity in the face of the head stone or monument 4, adapted to insert therein glass, marble, or any other insertion required.

Ornamentation in colored mosaic glass is shown at 8. This ornamentation may be of any design required, and of any color glass desired.

The mosaic glass is shown at 9; the same may be of any colored glass and of any ornamentation desired, The cap of said head stone or monument is shown at 10. This cap 10 may be ornamented in any ornamentation of mosaic glass desired; the same being made separate and held in place on said head stone or monument by reinforcing rods 11 which are embedded in the concrete of cap 10 and in the concrete of the head stone or monument before the same sets.

The corner members 12 extend the entire length of the monument and are made of reinforced concrete. Longitudinal grooves in the corner members are shown at $12^b$; iron anchor rods are shown at 13 placed at intervals in the corner members 12, said anchor rods having cross bars 14 integral therewith. The slabs or walls are shown at $12^a$, the edges of which are adapted to engage the longitudinal grooves $12^b$ in the corner members 12.

At the outer end of rods 13 are angle bars 15 which are an integral part of iron anchor rods 13, the same being embedded in the concrete supports 12. Said bars 15 are threaded at 16 to receive screws $5^a$, which hold metal protecting supports 5 in place.

Body concrete is shown at 17.

A plurality of reinforcing bars are shown at 18 embedded in the body concrete 17. Wire screen is shown at 19 adapted to strengthen and reinforce the slabs $12^a$ and to hold the sand and cement 20 solid in place. These slabs $12^a$ are made separate and let harden and may be of different shapes and designs necessary for various styles and ornamentation of monuments. The sand and cement 20 is adapted to hold the mosaic glass ornamentation 8 and 9 firmly in place.

While this specification sets forth in detail, the present construction of my artificial monument, still, in practice, changes in form, proportions and minor details of construction may be resorted to within the scope of the appended claims.

The operation of my artificial monument is as follows: The corner members 12 and slabs $12^a$ are formed into a box-like structure upon a suitable base previously prepared. Concrete is now poured in until the structure is filled. A cap or top for the monument which has previously been prepared the same way as the body of the monument and allowed to set or harden, is placed upon the top of the body portion, the reinforcing rods 11 of the cap are froced down into the soft concrete 17 until a good joint is obtained; inscriptions or ornamentations may be set in the cavities 3, 6, and 7 as desired. The slabs $12^x$ may be made in different shapes and styles, and a number of the several parts of the monument may be kept in stock ready for setting up when and where desired.

Having thus described my invention, what I claim as new and desire to secure by Letters Patent is:

1. An artificial monument of the class described consisting of corner members made of reinforced concrete and having longitudinal grooves therein; metal corner protecting strips secured to the corner members; a plurality of slabs, the edges of which are adapted to engage the grooves in the corner members, thereby forming, when assembled, a box-like structure, adapted to receive a body of concrete poured therein; means for anchoring said slabs to the body concrete; glass cemented to one side of the slabs substantially as set forth.

2. In an artificial monument of the class described, a plurality of reinforced concrete corner members having longitudinal grooves therein, one on each side thereof; metal corner protecting strips secured to each corner member; a plurality of reinforced concrete slabs, the edges of which are adapted to engage the grooves in the corner members; glass cemented to the outer face of the slabs; means for holding said slabs and corner members together in box-like shape adapted to receive a body of concrete poured therein; a cap member, adapted to fit the top of the box-like structure and means for anchoring the cap member to the body of the monument after the body concrete is poured therein, substantially as set forth.

In testimony whereof I affix my signature in the presence of two subscribing witnesses.

SYLVAIN LE DEIT.

Witnesses:
 PERCY O'CONNOR,
 M. J. SELAYA.